Figure 1:
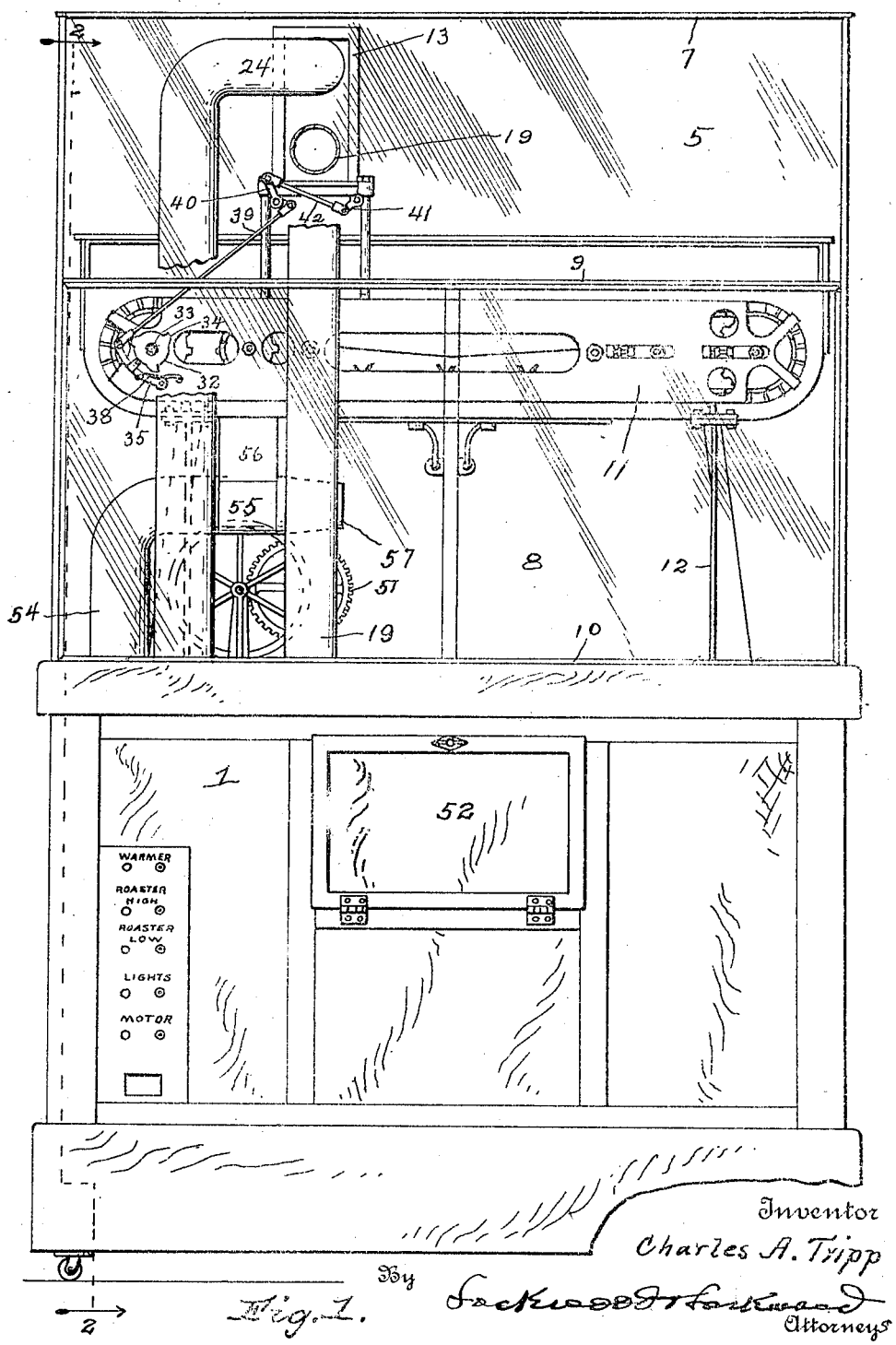

C. A. TRIPP.
MEANS FOR SUPPLYING MATERIAL TO AND REMOVING IT FROM ROASTERS, POPPERS, AND THE LIKE.
APPLICATION FILED OCT. 16, 1917.

1,298,265.

Patented Mar. 25, 1919.
4 SHEETS—SHEET 1.

Inventor
Charles A. Tripp

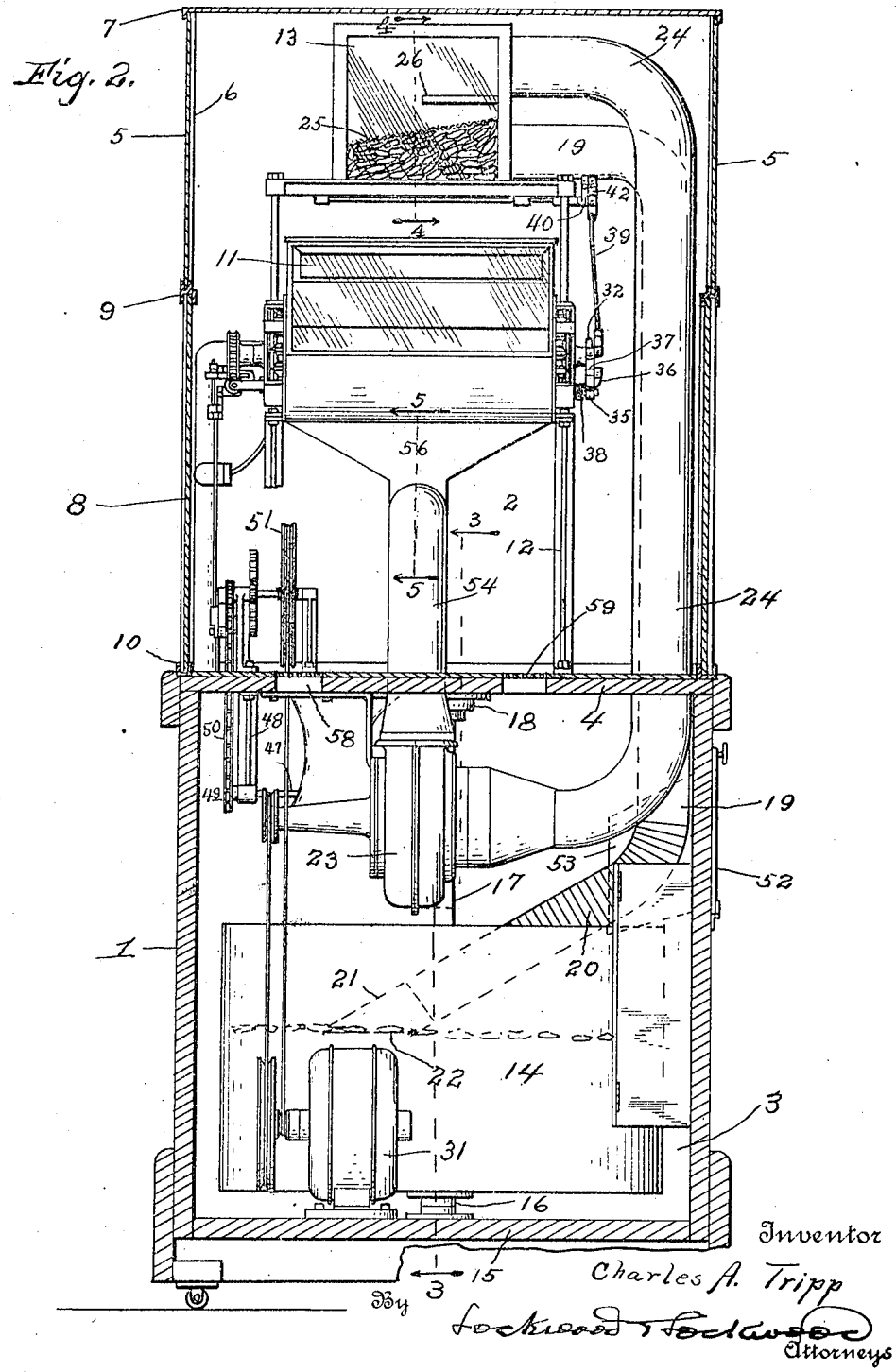

C. A. TRIPP.
MEANS FOR SUPPLYING MATERIAL TO AND REMOVING IT FROM ROASTERS, POPPERS, AND THE LIKE.
APPLICATION FILED OCT. 16, 1917.
1,298,265.
Patented Mar. 25, 1919.
4 SHEETS—SHEET 3.
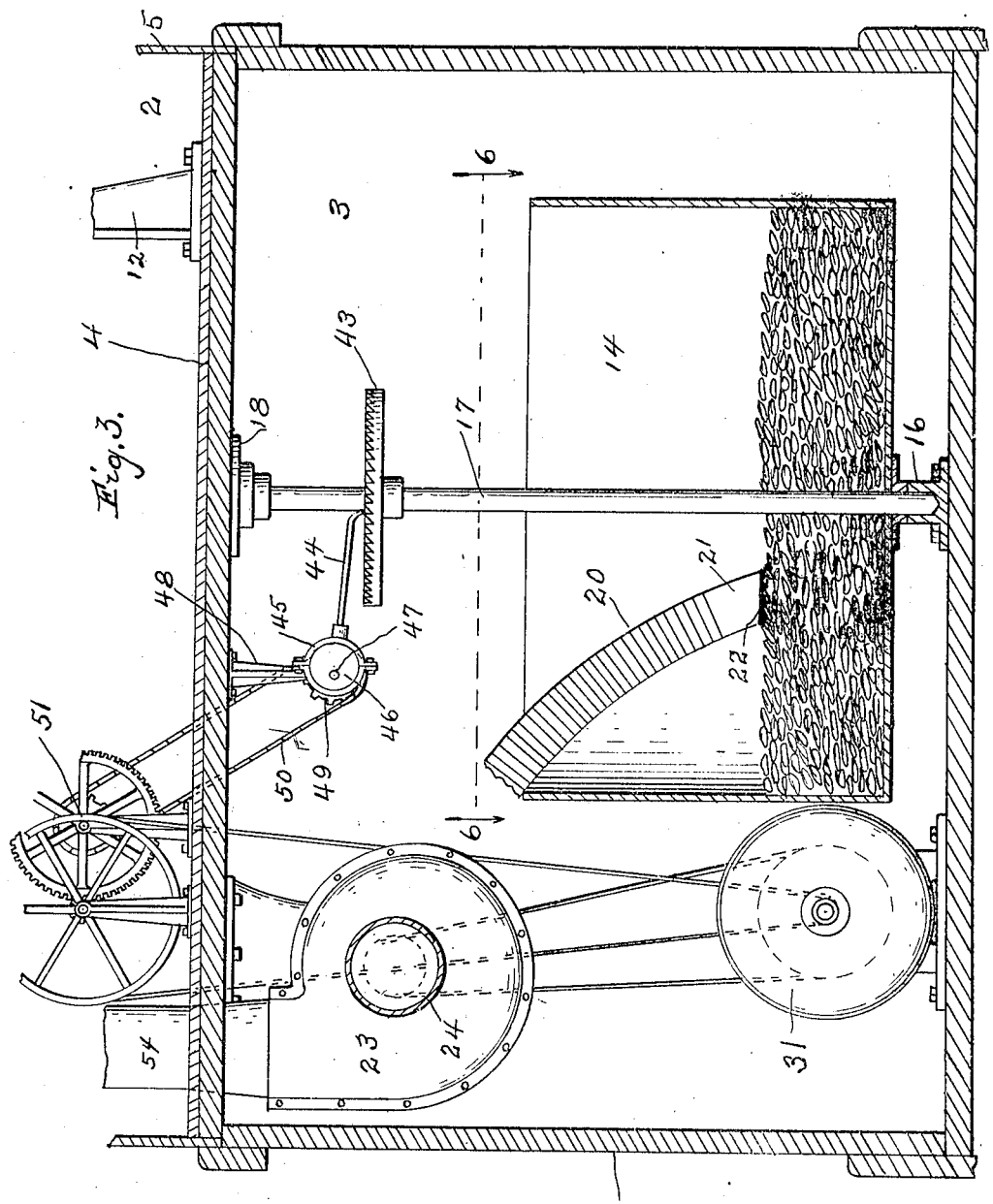

C. A. TRIPP.
MEANS FOR SUPPLYING MATERIAL TO AND REMOVING IT FROM ROASTERS, POPPERS, AND THE LIKE.
APPLICATION FILED OCT. 16, 1917.
1,298,265.
Patented Mar. 25, 1919.
4 SHEETS—SHEET 4.
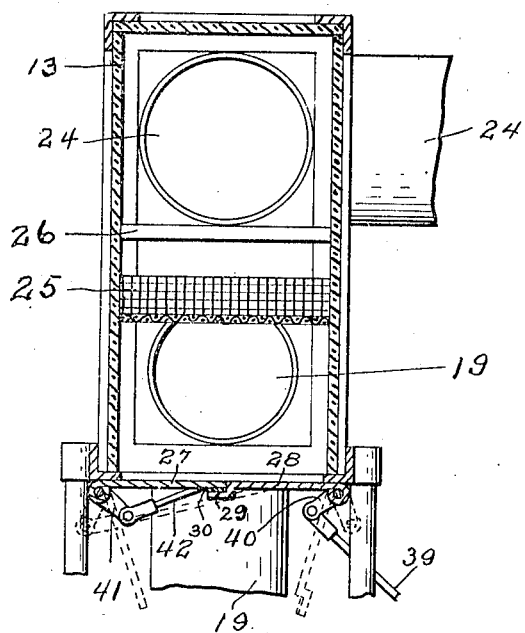
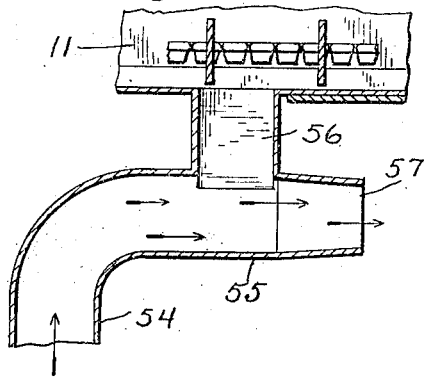
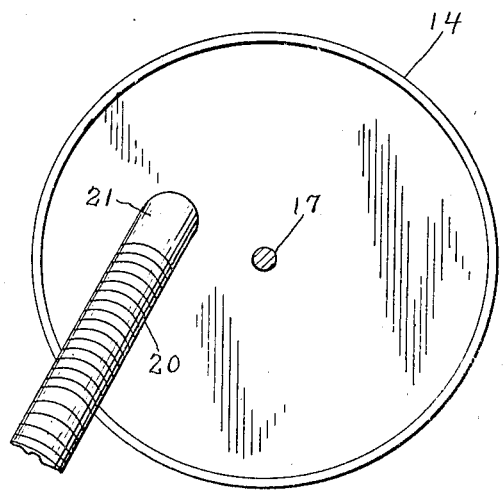
Inventor
Charles A. Tripp.
By Lockwood & Lockwood
Attorneys

UNITED STATES PATENT OFFICE.

CHARLES A. TRIPP, OF INDIANAPOLIS, INDIANA, ASSIGNOR TO HOLCOMB & HOKE MANUFACTURING COMPANY, OF INDIANAPOLIS, INDIANA, A CORPORATION.

MEANS FOR SUPPLYING MATERIAL TO AND REMOVING IT FROM ROASTERS, POPPERS, AND THE LIKE.

1,298,265.  Specification of Letters Patent.  Patented Mar. 25, 1919.

Application filed October 16, 1917. Serial No. 196,920.

*To all whom it may concern:*

Be it known that I, CHARLES A. TRIPP, a citizen of the United States, and a resident of Indianapolis, county of Marion, and State of Indiana, have invented a certain new and useful Means for Supplying Material to and Removing it from Roasters, Poppers, and the like; and I do hereby declare that the following is a full, clear, and exact description thereof, reference being had to the accompanying drawings, in which like letters refer to like parts.

The object of this invention is to provide pneumatic means for supplying peanuts or other material to mechanism for roasting or otherwise treating the same. This is of peculiar importance in the case of bulky nuts or material like peanuts and enables the supply of peanuts and the like to be kept in a tub or receptacle below the mechanism for roasting or otherwise treating the same, and to be elevated from the tub or other receptacle, by the pneumatic means referred to, up to a charging chamber above such treating mechanism. The charging chamber is preferably adapted to receive and hold substantially one charge or a predetermined amount of the peanuts or other material. This enables the mechanism for treating the peanuts or other material to be in a relatively elevated position and at a height convenient for both observing and manipulating the same, and enables such part of the machine to be visible not only to the operator, but to the public, which is very desirable in advertising and selling the roasted peanuts or the like. This also enables a space or chamber to be located below the treating mechanism and above the chamber containing the tub or other supply of peanuts or the like, for receiving and holding the roasted peanuts and the like in a position accessible to the operator and also conspicuous to the public.

Another object of this pneumatic feeding mechanism besides the foregoing is that little rocks, pebbles and heavy particles of dirt or other foreign matter would not be taken up by the pneumatic means and fed to the roasting or treating mechanism. On the other hand, if the nuts or the like were located above such mechanism and fed down thereto by gravity, this foreign matter would go into the roasting or treating mechanism along with the peanuts or the like instead of being separated.

Another feature of the invention consists in the pneumatic supply pipe entering the lower part of the charging chamber and the exhaust leading from the upper part of said chamber. Along with the foregoing is the further idea of providing a screen in the charging chamber located above the inlet pipe and below the outlet pipe. This keeps the nuts and the like away from the outlet pipe so as not to choke the same and so as to permit the air to escape readily therethrough.

Another feature of the invention is the provision of a deflector plate above the screen and extending from the side of the charging chamber in which the inlet and outlet are located and substantially one half the length of the charging chamber and causing the air to travel a distance into the chamber before passing to the upper portion thereof, so that the nuts entering the chamber will first fill the nut holding portion of said chamber at points remote from the inlet pipe so that they will not obstruct the passage of the air from the inlet pipe up through the screen and through the outlet, until the nut receiving portion of said chamber is full, and as it approaches fullness it will gradually reduce the suction or air movement and if it becomes entirely full, will practically cause the air movement to cease automatically.

Another feature of the invention consists in providing means for opening and closing the bottom of the charging chamber which is controlled by timed actuating mechanism so that after sufficient time has lapsed for the chamber to become filled with peanuts and the like, the doors will open and allow the contents to drop down by gravity at a predetermined time to the mechanism for roasting or treating the same. When the bottom of the charging chamber is opened, the passage of air up through the inlet pipe ceases until the bottom of the charging chamber is again closed, and when it is closed, the air circuit is again reëstablished and it again begins to elevate the nuts in the manner heretofore described. The suction fan, however, operates all of the time and while the bottom of the charging chamber is open, the outlet pipe takes its air through the open bottom of the chamber.

Another feature of the invention along with the foregoing is a connection between the feeding or operating means of the roaster or mechanism for treating the peanuts or the like, and the means for opening and closing the bottom of said charging chamber so as to properly time the relative operations of said parts in order that they may coöperate satisfactorily.

Another feature of the invention consists in rotating the tub which holds the supply of peanuts and the like, and in forming the pneumatic tube which takes up the peanuts therefrom, flexible and with a beveled nozzle adapted to drag over the surface of the peanuts or contents of the tub. By rotating the tube the peanuts or material are taken therefrom uniformly throughout the surface of the pile of nuts in the tub and by beveling the nozzle and rotating the tub and moving the surface of the peanuts under the nozzle and the nozzle lying by gravity thereon and dragging over the surface of the peanuts, the suction therethrough will take up the peanuts as the nozzle will fit or lie all around its edges on the surface of the peanuts. In fact, the weight of the nozzle and the flexible end of the tube causes the nozzle to embed its edges in the peanuts to some extent. This prevents free air from entering the nozzle and causes it to take up the peanuts.

Another feature of the invention is the employment of pneumatic means for discharging the peanuts or other material from the mechanism for roasting or treating the same. As herein shown there is a chamber below said roasting mechanism for receiving and holding the roasted peanuts. The roasted nuts are discharged from said roasting mechanism into a pnuematic tube from which the nuts are blown into the opposite end of the charging chamber for holding the roasted peanuts. The chief object of this pneumatic discharge is to convey or discharge the nuts to the other end of the chamber instead of providing a more complicated mechanism for conveying the same there. This method is economical because the same fan operates this discharge blast as operates the feeding mechanism. Another important advantage is that the discharge of the nuts from the blast fan is such as to attract the attention of bystanders and the public and to promote the advertisement and sale of the peanuts and the like.

The foregoing inventions are not limited to any particular arrangement or construction for roasting or otherwise treating the nuts or other material.

The full nature of the invention will be understood from the accompanying drawings and the following description and claims:

In the drawings, Figure 1 is a front elevation of the machine with the lower right hand corner broken away. Fig. 2 is a vertical section on the line 2—2 of Fig. 1. Fig. 3 is a vertical section on the line 3—3 of Fig. 2. Fig. 4 is a vertical section through the feed chamber on the line 4—4 of Fig. 2. Fig. 5 is a vertical section of a part of the machine on the line 5—5 of Fig. 2. Fig. 6 is a horizontal section on the line 6—6 of Fig. 3, showing a plan view of the tub.

Referring to the drawings in which similar reference numerals designate corresponding parts throughout the several views, 1 indicates a cabinet which is divided into upper and lower compartments 2 and 3, respectively, by means of a division wall 4. The walls of the compartment 3 are preferably constructed of wood, while the upper compartment 2 is preferably formed of strips of glass 5, metal strips 6 being provided at the corners of the cabinet to support the sections of glass, while the top 7 is likewise preferably formed of metal and secured to the corner strips in any suitable manner.

The side walls of the upper compartment are formed in sections, the lower portions of the side walls being formed of sliding sections 8 of glass so that access may be had to the interior of the compartment 2. Suitable metallic guides 9 and 10 are provided for supporting or holding the sliding sections in proper position and also providing ways in which the sections may move longitudinally of the compartment and telescope with each other. Located in the upper compartment 2 is a heating mechanism 11 which is mounted upon standards 12 which are in turn secured to the division wall 4, said heating mechanism being designed for roasting peanuts or other similar material, said material being designed to be deposited in prescribed quantities into the heating mechanism.

To this end, therefore, the product is deposited in a charging compartment 13 which is preferably positioned at a point above the heating mechanism so that when the charge of the product within the chamber is released, it will descend into the heating mechanism and in order to prevent heavy foreign particles, such as pebbles, chunks of dirt or the like, from being carried into the charging chamber, the product is preferably located within the lower compartment 3 and conveyed into the charging chamber by pneumatic means. To this end, therefore, a tub or receptacle 14 is rotatably mounted upon the floor 15 of the lower compartment 3 by suitable bearings 16, a shaft 17 extending from the bearings 16 centrally through said tub and having its upper end anchored in bearings 18 on the under face of the division wall 4.

Extending vertically of the cabinet 1 is a supply pipe 19, the lower end of the supply pipe having a flexible section 20 adapted to extend into the tub 14, the free end of the flexible section having a nozzle 21 thereon, the open end of which is beveled, as shown at 22, in such manner as to rest substantially parallel with the surface of the nuts contained in the tub, the weight of the flexible section being such as to cause the edge of the nozzle to descend slightly beneath the uppermost surface of the nuts so that the nuts will be more readily drawn into the nozzle when a suction is created through the supply pipe.

The upper end of the supply pipe 19 enters the charging chamber 13 preferably through one end wall of the charging chamber and adjacent the lower edge thereof so that the product will be discharged into the lower portion of the charging chamber.

The product is drawn through the supply pipe 19 by pneumatic action created by positioning a suction fan 23 in the lower compartment 3 and preferably suspending the same from the division wall 4, an exhaust pipe 24 being extended from the suction fan to the charging chamber, said exhaust pipe being entered through the end wall at a point above the supply pipe and at a point adjacent the upper top end of the charging compartment. To prevent the nuts or product from being drawn into the exhaust pipe and from thence into the suction fan, a perforate partition 25, preferably of mesh wire, is extended longitudinally of the charging compartment and from side to side thereof, one end of the perforate partition being engaged with the end wall of the charging compartment at a point immediately above the end of the supply pipe entering the charging compartment, while the opposite end of the perforate partition is attached to the opposite end wall of the charging compartment. By mounting the perforate partition 25 in this manner, the product when discharged into the charging chamber, first fills up the narrow end of the space below the perforate partition, thus always leaving a passage for the air as it is drawn through the supply pipe into the exhaust pipe until such time as the space below the perforate partition 25 is filled with the nuts or other material. This constitutes means for measuring each charge of peanuts to be supplied to the roasting means.

When the chamber is filled or nearly so the passage of air through the supply pipe is practically cut off or is reduced to such an extent that no more of the product will be drawn upwardly into the pipe and thus avoiding the possibility of choking the pipe with the product should the product not be instantly discharged from the charging chamber as soon as the space below the perforate partition is filled. The air drawn through the supply pipe 19 is caused to travel a distance into the charging compartment by means of a deflector 26, thus carrying the first supply of nuts to the far end of the charging compartment, and also preventing the air from passing directly upwardly from the supply pipe into the exhaust pipe.

After the lower portion of the charging compartment has become filled with the nuts, and the heating mechanism is in position to receive the charge of nuts or the like within the charging chamber, a pair of doors 27 and 28, which are hingedly mounted below the open end of the charging chamber 13, are swung to open position, thereby releasing the contents of the charging chamber and permitting the same to descend into the heating mechanism, the door 28 having an extension 29 at its inner edge which overlaps the door 27 and by placing a strip 30 of felt or other material between the extension 29 and the outer face of the door 27, a substantially air tight seal will be formed between the two doors.

The suction fan 23 is operated in any suitable manner, as by means of a motor 31 mounted on the floor 15 of the lower compartment 3, said motor also being attached in a suitable manner to the heating mechanism 11 and through the driven parts of the heating mechanism, the doors 27 and 28 are operated. The doors are operated by placing a wheel 32 on the driven shaft 33 of the heating mechanism, the peripheral edge of the wheel having a plurality of cam faces 34 for engagement with a lever 35 pivotally attached to one face of the heating mechanism. The lever 35 is provided with an extension 36 which carries a roller 37 for engagement with the cam faces 34, the roller being held in the path of said cam faces and resting against the peripheral edge of the wheel 32 by means of a spring 38.

Extending from the movable end of the lever 35 is a rod 39, the opposite end of which is attached to one arm of a bell crank lever 40 mounted upon the shaft carrying the door 28, the opposite arm of said bell crank lever being attached to a crank 41 which is fixed to the shaft carrying the door 27, by means of a link 42, and by this construction it will be readily seen that when the lever 35 is swung on its pivot by the action of one of the cam faces against the roller, the doors 27 and 28 will be automatically opened. It will likewise be seen that as soon as the roller has passed beyond the cam face, the doors will be instantly closed, partially through the influence of the spring 38 and partially through the suction created by the fan 23.

In order to keep the product within the tub 14 substantially level throughout its surface, thus causing the product to properly feed into the supply pipe 19, the tub 14 is rotated by placing a ratchet wheel 43 on the shaft 17 preferably at a point above the tub with which coöperates a pawl 44 attached to an eccentric strap 45. The eccentric strap 45 coöperates with an eccentric wheel 46 fixed to a shaft 47, said shaft being suspended from the division wall 4 by brackets 48. The shaft 47 has attached thereto a sprocket wheel 49 with which coöperates a sprocket chain 50 for driving the sprocket wheel and eccentric wheel, said chain extending in coöperation with gear mechanism 51 operated by the motor 31. As the shaft 47 is rotated, the pawl 44 will be reciprocated over the ratchet wheel, thereby intermittently and slowly imparting rotating movement to the tub.

One wall of the cabinet 1 is provided with a door 52 through which the product is introduced into the tub, a chute 53 being attached to the inner face of the wall of the cabinet in the compartment 3 and around the opening covered by the door 52, said chute readily conveying the product into the tub.

The product treated by the heating mechanism is preferably discharged from the heating mechanism at the end thereof into which the product is deposited from the charging compartment 13 and in order to carry the product to the opposite end of the compartment 2 from that wherein the product is discharged, a blast pipe 54 is extended upwardly from the fan 23 into the upper compartment 2, the horizontal portion 55 thereof having a flared hopper 56 which communicates with the heating mechanism and through which the product from the heating mechanism is conveyed into the blast pipe 54, that portion of the blast pipe beyond the hopper being preferably restricted or formed into a nozzle 57 which causes the product to leave the pipe with greater force than would result if the pipe were left straight. Catapulting the product through the compartment 2 to a point adjacent one end thereof by a blast of air, not only deposits the product in a convenient position for readily handling and disposing of the same, but owing to the transparent walls of the compartment 2, tends to attract attention of the public and thus provide an advertising feature as well as a convenient manner of handling the product.

In operation, a plurality of nuts, or other product, are placed in the tub and the motor started, which will result in operating the suction fan 23 and creating a suction in the exhaust pipe 24 and as the charging compartment 13, when the doors 27 and 29 are closed, is substantially air tight, a suction will be created through the supply pipe 19, thereby drawing particles of the product upward through the supply pipe and into the portion of the charging compartment below the perforated partition, 25, the discharge of the product into said charging compartment continuing until the space below the compartment is filled, whereupon the product will so choke or restrict the amount of air passing through the supply pipe as to prevent the same from elevating any more of the product. As soon as the wheel 32 has been rotated to position to bring one of the cam faces 34 into engagement with the roller 27, thus forcing the roller and lever 35 carrying the same outwardly and downwardly, the bell crank lever 40 will be rocked and both of the doors 27 and 28 thrown to open position, whereupon the product within the charging compartment will descend into the heating mechanism and so long as said doors remain in open position, the air will be drawn upwardly through said charging compartment into the exhaust pipe 24 instead of through the supply pipe 19. As soon, however, as the doors are again closed, the suction of air through the supply pipe is resumed, thereby bringing a new supply of the product into the charging compartment.

Likewise it can be seen that by positioning the tub in the lower portion of the cabinet, no heavy foreign particles will be carried upwardly through the supply pipe and discharged into the heating mechanism, this being an important feature in view of the fact that any solid foreign particles would tend to injure the heating mechanism under certain conditions. Likewise it will be seen that as the cabinet is substantially air tight, when all of the compartments are closed, the same air is used over and over again through the suction fan and as said air is heated by coming in contact with the heating mechanism, a more stable heat may be maintained, as fresh quantities of cold air are not continually being discharged or brought into contact with the heating mechanism. Openings 58 are formed through the division wall 4, through which the air may pass from the upper compartment into the lower compartment, the bars 50 being preferably disposed across said openings to prevent the product from dropping therethrough.

This invention is not necessarily limited to roasting peanuts as it may be employed in roasting or treating by heat or otherwise, other products.

The invention claimed is:

1. A machine for treating peanuts or like material, including a flexible non-collapsible tube for feeding the peanuts from a source of supply to the mechanism of the machine for treating the same, the lower end of the tube adapted to rest on the surface of the peanuts, means for moving the supply of nuts in a circular path below the lower end of the tube, and means for exhausting air through said tube for elevating the peanuts through the tube.

2. A machine for treating peanuts or like material, including a flexible non-collapsible tube for feeding the peanuts from a source of supply to the mechanism of the machine for treating the same, the lower end of the tube being shaped transversely so that its edge all around will lie flat on the surface of the peanuts, a rotating receptacle for containing the supply of material to be treated, means for rotating said receptacle for causing the end of the tube to drag over the contents thereof, and means for exhausting air through said tube for elevating the peanuts through the tube.

3. A machine for treating peanuts or like material, including a horizontally rotatable receptacle for the peanuts, a flexible non-collapsible tube projecting into said receptacle with its inner end adapted to lie upon and drag over the surface of the peanuts therein, and means for exhausting air through said tube for elevating the peanuts through the tube.

4. A machine for treating peanuts or like material, including a horizontally rotatable receptacle for the peanuts, a stationary flexible non-collapsible tube for feeding peanuts to mechanism for treating the same, the free end of said tube extending into said receptacle so as to drag over the surface of the peanuts therein, and means for exhausting air through said tube for elevating the peanuts through the tube.

5. A machine for treating peanuts or like material, including a horizontally rotatable receptacle for the peanuts, a flexible non-collapsible tube projecting into said receptacle with its inner end adapted to lie upon the surface of the peanuts therein, a fan for exhausting air through the tube for elevating the peanuts or the like therethrough, and a single means for operating the fan and rotating the receptacle.

6. A machine for treating peanuts or like material, including an air-tight feed chamber, a rotating receptacle upon a lower level than said feed chamber for holding a supply of peanuts, and pneumatic means including said chamber for elevating said peanuts from said receptacle and discharging them into said feed chamber.

7. A machine for treating peanuts or like material, including an air-tight feed chamber, a rotating receptacle upon a lower level than said feed chamber for holding a supply of peanuts, a flexible tube extending from said feed chamber down into said receptacle with the lower end lying upon the surface of the peanuts therein, an exhaust fan, and a tube leading from said fan to the feed chamber.

8. A machine for treating peanuts or like material, including a nut receiving chamber, means for feeding the peanuts from the lower side of said chamber, a perforate partition in said chamber, means for exhausting the air from the chamber above said partition, a tube leading from the source of supply of peanuts to said chamber below the partition, and a deflector plate above said partition adapted to cause the air and nuts carried thereby to travel to the far end of said chamber.

9. A machine for roasting peanuts or like material, including a casing having a transparent upper portion and non-transparent lower portion, a receptacle for the peanuts located in the lower portion and a floor for the upper portion located between the two portions of the casing, mechanism for roasting the peanuts horizontally disposed in the upper portion so as to leave a chamber between the same and the bottom of the upper portion for the roasted peanuts and having a discharge outlet near one end thereof, pneumatic means for elevating peanuts from the receptacle below to a position above said roasting mechanism for feeding the same to said mechanism, and pneumatic mechanism for blowing the peanuts discharged from said roasting mechanism horizontally to the opposite end of the receiving chamber for the roasted peanuts.

10. A machine for roasting or otherwise treating peanuts or like material, including mechanism for roasting or otherwise treating the same, a chamber above said mechanism, means for feeding the peanuts from the lower side of said chamber to said mechanism, a perforate partition in said chamber, means for exhausting the air from the chamber above said partition, a tube leading from the source of supply of peanuts or the like to said chamber below the partition, and a deflector plate above said partition adapted to cause the air and nuts carried thereby to travel to the far end of said chamber.

In witness whereof, I have hereunto affixed my signature.

CHARLES A. TRIPP.

Copies of this patent may be obtained for five cents each, by addressing the "Commissioner of Patents, Washington, D. C."